Figure 1:
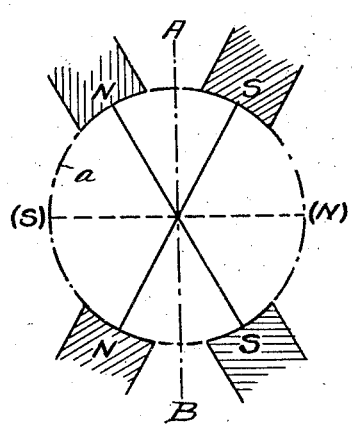

Jan. 13, 1931.     F. TOEWE     1,788,813
SYNCHRONOUS MOTOR FOR DRIVING CLOCKS AND THE LIKE

Filed Aug. 2, 1929

INVENTOR
*Fritz Toewe,*
BY
*Harold J. Penney,* ATTORNEY

Patented Jan. 13, 1931

1,788,813

UNITED STATES PATENT OFFICE

FRITZ TOEWE, OF VILLINGEN, GERMANY, ASSIGNOR, BY MESNE ASSIGNMENTS, TO KIENZLE TAXAMETER UND APPARATE A. G., OF VILLINGEN, GERMANY, A CORPORATION OF GERMANY

SYNCHRONOUS MOTOR FOR DRIVING CLOCKS AND THE LIKE

Application filed August 2, 1929, Serial No. 382,883, and in Germany August 12, 1928.

My invention relates to improvements in a synchronous motor for driving clocks and the like and it consists in the novel features, which are hereinafter more fully described.

One of the objects of my invention is to avoid the use of several exciter windings and stator steel laminations, which are at present in use in synchronous motors and which are not suitable for economical mass production.

Another object of my invention is to produce a perfected synchronous motor, which has as simple a construction as possible and as simple an excitation of the field as possible.

Other objects and advantages will hereinafter appear.

I attain these objects by the synchronous motor, one form of which is illustrated in the accompanying drawings or by any mechanical equivalent or obvious modification of the same.

In the preferred form or embodiment of my invention I dispose field poles of the same sign only in the correct pole distribution on both sides of a plane of symmetry; I also prefer to divide the stator laminations themselves according to this plane of symmetry with the result that the stator consists of uniform stampings.

Figure 2:
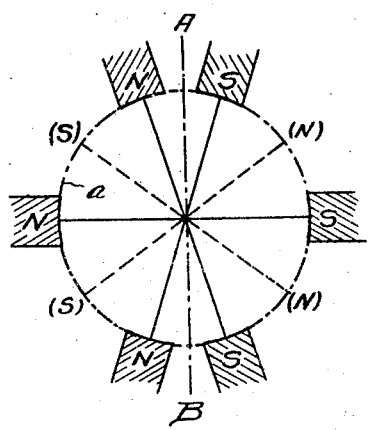
Figure 3:
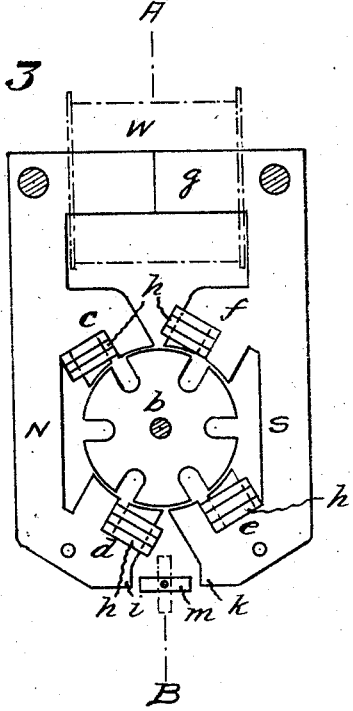

In the drawings,

Figs. 1 and 2 are diagrammatical illustrations of the fields of distribution of six pole and ten pole fields respectively; and Fig. 3 is a diagrammatic view in elevation of a 6 pole synchronous motor.

In Fig. 1, the field, which is represented by the circle $a$, is divided for a 6-pole rotor or, in other words, 6 field poles are to be spaced, with alternating signs, at equal distances apart on the circumference of the circle $a$. If a motor of this type is connected with an A. C. supply of 50 periods, the motor shaft would turn 1000 R. P. M.

According to this invention, a plane of symmetry is disposed through the field, indicated by the line A—B. On the left side of A—B a pole (S) has been eliminated, likewise to the right a pole (N) of opposite sign has been eliminated with the result that on each of the two sides of the plane of symmetry are always two poles (N, N) or S, S, of the same sign. They are located in the correct pole distribution, i. e. the poles of even sign follow each other at a distance of two pole divisions, while the poles of opposite sign are only one pole division apart from one another.

Fig. 3 shows a stator according to the mode of distribution of Fig. 1. The stator surrounds a 6-part synchronous rotor $b$ with 4 pole pieces $c, d, e, f$. The pole pieces $c$ and $d$ are made up from the one pole N of the exciter winding W and the pole pieces $e$ and $f$ of the other pole S of W. The core $g$ of the stator is divided according to the plane of symmetry A—B with the result that the stator laminations N, S are of exactly the same form.

It is clearly evident that the novel arrangement of the multi-polar field insures an especially cheap construction of the stator.

In the case of self-starting synchronous motors, in which the rotor receives his starting impulse by means of an additional rotary field, it is of advantage to split the field poles $c, d, e, f$, and to provide each half of the poles with the well known shielding coils $h$, thereby obtaining a Ferraris rotating field.

In the case of clocks which are driven by A. C. motors, use is often made of the natural stray-field of the field magnet, in order to release, by means of an additional armature $m$, a signal or even an auxiliary clockwork, should, for some reason or other, the line voltage fail to work. For the purpose of obtaining a stray-field as active as possible, 2 pole-lugs $i$ and $k$ are provided on the pole pieces $d$ and $e$, see Fig. 3, the desired straying field being produced between these pole-lugs.

As may be seen from Fig. 2, the present invention may also be used in a synchronous motor of any desired number of poles, for instance 10 poles. In this case 3 poles of the same sign are disposed on both sides of the plane of symmetry A—B and also obey the above described law as to the correct pole distribution. Also here, the stator of this synchronous motor is of extremely simple construction, the stator laminations consisting of stampings of uniform shape.

Variations are possible and parts of my invention may be used without other parts.

I do not, therefore, restrict myself to the details as shown and described, but I intend to include also all mechanical equivalents and obvious modifications of the same, within the scope of my invention.

I claim as my invention, and desire to secure by Letters Patent:

1. In a synchronous motor, a laminated stator consisting of appropriate plates formed with core bars and field-poles, said core bars being divided on the central vertical axis of said stator, said field poles being arranged in symmetry at opposite sides of said axis, the poles of each half of said stator being separated two pole distances, and the adjacent poles of the opposite halves of said stator being separated by a single pole distance.

2. In a synchronous motor, a rotor, a laminated stator consisting of a core bar and a plurality of field-poles; said core bar being divided on the central vertical axis of said rotor and stator; said field-poles being arranged in symmetry at opposite sides of said axis, all poles of each half of said stator being separated two pole distances, the adjacent poles of the opposite halves of said stator being separated but a single pole distance, and an exciter winding for operating said rotor.

3. In a synchronous motor, a rotor; a stator consisting of a core bar and a plurality of field poles, said core bar being divided on the vertical axial line of said rotor and stator, said field-poles being arranged in symmetry at opposite sides of said axial line and being centrally split; the poles at one side of said axial line being of one sign, while the poles at the opposite side of said line being of opposite sign; the poles of even sign following each other two pole spaces apart, while the poles of opposite sign being but one pole space apart, and an exciter winding for operating said rotor.

4. In a synchronous motor, a stator consisting of plates of appropriate material, each plate being constituted by duplicate halves, each half being formed with a component half of a core bar, and a plurality of split poles spaced two normal pole distances apart, and perforations to receive binding bolts.

5. In combination, a stator, a rotor and an exciter winding; said stator consisting of a core bar, a plurality of split field-poles, and pole lugs at the bottom thereof, an armature operating between said lugs; said core bar being divided on the vertical axial line of said stator, rotor and armature, said field-poles on each half of said stator being spaced two normal pole distances apart and the adjacent poles of opposite halves of said stator being but one normal pole distance apart.

6. In a synchronous motor, a multi-polar stator consisting of two similar parts each part having a plurality of split poles two pole distances apart, the adjacent poles of opposite parts of said stator being one pole distance apart.

7. In a synchronous motor, a rotor having polar projections, and a multi-polar field, the circular series of field poles consisting of equal numbers of equal signs, said field-poles also being unequally spaced around said rotor, and an exciter winding to operate said rotor.

8. In a synchronous motor, a two part multi-polar stator, each part having poles of equal signs, the normal distance between the even sign poles being twice as great as the normal distance between the poles of opposite signs, for the purpose set forth.

Signed at Stuttgart, Germany, this 19th day of July, A. D. 1929.

FRITZ TOEWE.